United States Patent
Saich

(10) Patent No.: US 11,971,287 B2
(45) Date of Patent: Apr. 30, 2024

(54) LIQUID SENSOR

(71) Applicant: ASPEN PUMPS LIMITED, Hailsham (GB)

(72) Inventor: Claire Saich, Hailsham (GB)

(73) Assignee: ASPEN PUMPS LIMITED, Hailsham (GB)

( * ) Notice: Subject to any disclaimer, the term of this patent is extended or adjusted under 35 U.S.C. 154(b) by 317 days.

(21) Appl. No.: 17/429,932

(22) PCT Filed: Feb. 11, 2020

(86) PCT No.: PCT/GB2020/050304
§ 371 (c)(1),
(2) Date: Aug. 10, 2021

(87) PCT Pub. No.: WO2020/165567
PCT Pub. Date: Aug. 20, 2020

(65) Prior Publication Data
US 2022/0187114 A1    Jun. 16, 2022

(30) Foreign Application Priority Data
Feb. 11, 2019   (GB) .................................... 1901844

(51) Int. Cl.
*G01F 23/00*   (2022.01)
*G01F 23/263*  (2022.01)

(52) U.S. Cl.
CPC ........ *G01F 23/0007* (2013.01); *G01F 23/268* (2013.01)

(58) Field of Classification Search
CPC .. G01F 23/0007; G01F 23/268; G01F 23/265; G01F 23/263; G01F 23/26
See application file for complete search history.

(56) References Cited

U.S. PATENT DOCUMENTS

| | | | |
|---|---|---|---|
| 2011/0110792 A1 | 5/2011 | Mauro et al. | |
| 2011/0110794 A1* | 5/2011 | Mayleben | F04D 15/0218 417/313 |
| 2020/0264029 A1 | 8/2020 | Wernet et al. | |

FOREIGN PATENT DOCUMENTS

| | | |
|---|---|---|
| CN | 204241068 U | 4/2015 |
| CN | 205861161 U | 1/2017 |
(Continued)

OTHER PUBLICATIONS

Written Opinion for International Application No. PCT/GB2020/050304 dated Oct. 1, 2020, 9 pages.
(Continued)

*Primary Examiner* — David Z Huang
(74) *Attorney, Agent, or Firm* — Seyfarth Shaw LLP

(57) ABSTRACT

A liquid detector comprising a housing having a plurality of side walls and a bottom surface; a sensor mounted within a cavity of the housing and having a sensing surface configured to detect a liquid on an outer surface of a first of the plurality of side walls, and securing means to secure the housing relative to a surface of an external reservoir, wherein the plurality of side walls extends from a top end to a lower end, wherein the bottom surface has a profile comprising a first portion and a second portion, wherein the first portion and second portion are lower than the plurality of side walls, and wherein at least a lower-most point of the second portion is lower than at least one point of the first portion.

11 Claims, 4 Drawing Sheets

(56) References Cited

FOREIGN PATENT DOCUMENTS

| | | |
|---|---|---|
| DE | 102004038253 A1 | 3/2006 |
| DE | 102015122177 A1 | 6/2017 |
| GB | 1312433 A | 4/1973 |
| GB | 2568283 A | 5/2019 |
| GB | 2579794 A | 7/2020 |

OTHER PUBLICATIONS

International Search Report for International Application No. PCT/GB2020/050304 dated Oct. 1, 2020, 4 pages.
Combined Search and Examination Report for GB1901844.9 dated Sep. 1, 2020, 8 pages.

* cited by examiner

LIQUID SENSOR

CROSS REFERENCE TO RELATED APPLICATIONS

This is a National Stage application of, and claims priority to, PCT/GB2020/050304, filed Feb. 11, 2020, which further claims priority to GB Patent Application No. 1901844.9, filed Feb. 11, 2019, the disclosures of which are incorporated herein by reference in their entirety.

BACKGROUND

Accurately detecting the presence of liquids, in particular the accurate measurement of liquid levels, is important in a number of different situations. One such example is in air-conditioning units, where it is important to accurately detect condensate levels within a condensate reservoir of the air-conditioning unit to control operation of a pump to evacuate the condensate from the reservoir and to ensure that the level of condensate is not too high or too low. If the condensate level is too high, or overflowing in extreme cases, this can result in water damage to the surfaces or structures surrounding or supporting the air conditioning unit. If the condensate level is too low, this can result in air being drawn into the pump motor, which in turn causes significant noise to be generated during normal operation of the condensate pump. This is particularly undesirable when the air-conditioning units are installed in residential or commercial spaces in the presence of people. In manufacturing facilities, storage tanks or containers can contain liquids that need to be kept above a threshold to avoid equipment becoming damaged or production stopping completely. Often such containers are monitored remotely and therefore it is important to know that when the liquid level within such a container drops below a certain level, the sensors measuring the liquid level are able to accurately and reliably detect this.

One way to detect liquid levels within a reservoir is to use a capacitance sensor. For example, it is known to incorporate a capacitance sensor within a reservoir in a condensate pump of an air-conditioning system, so that the condensate pump can be operated based on the measured condensate level. Securing the capacitance sensor within the housing of the condensate pump and having a portion of the housing extend into the reservoir volume enables the sensing element of the capacitance sensor to be in close proximity to the condensate. This allows the sensor to detect the liquid level without needing to be in direct contact with the condensate itself.

Whilst such non-contact sensors are desirable, it has been found that as the level of condensate lowers in the reservoir, some liquid may be retained on the surface of the housing containing the sensor. This has resulted in erroneous readings being outputted, as the overall condensate level within the reservoir has decreased below the bottom of the sensor, but some condensate retained on the sensor housing is causing the sensor to output a reading indicating a higher condensate level than is actually present. In some cases, this residual condensate is in the form of a film of condensate on the sensor housing surface, which may cause erroneous readings to be output. In other cases, droplets may form on the bottom end of the housing containing the sensing element as the condensate level decreases below the bottom of the sensor housing. These residual droplets may also be detected by the sensor and result in erroneous outputs. In other cases, it has also been found that a meniscus can form between the surface of the condensate and the bottom of the sensor housing, even when the overall condensate level is actually below the sensing element. When such a meniscus is formed the sensor can also detect the presence of this liquid on the sensor housing and consequently output an erroneous measurement.

A further problem with prior art liquid sensors arises during normal maintenance of the condensate pump. It is normal to remove the condensate reservoir and apply cleaning liquids to the internal surfaces of the reservoir to prevent mold growth. However, these cleaning liquids, which contain surfactants having a hydrophobic end and a hydrophilic end, have been found to exacerbate the problem. As the housing of the liquid level sensor is made from a polymer, the hydrophobic ends of the surfactants are drawn to the polymer surface of the sensor housing and form a thin film around the sensor housing surface. As the condensate reservoir typically contains water, and the hydrophobic ends of the surfactants are attracted to the sensor housing surface, the hydrophilic ends of the surfactants attract water molecules and results in a layer of water being retained around the sensor. As the sensor is able to detect liquid on the surface of the sensor housing, the sensor detects this layer of water and consequently considers the overall liquid level to be higher than it actually is.

The present invention seeks to address at least some of these problems.

BRIEF SUMMARY OF THE DISCLOSURE

Viewed from a first aspect, the present invention provides a liquid detector comprising a housing having a plurality of side walls and a bottom surface; a sensor mounted within a cavity of the housing and having a sensing surface configured to detect a liquid on an outer surface of a first of the plurality of side walls, and securing means to secure the housing relative to a surface of an external reservoir. The plurality of side walls extends from a top end to a lower end. The bottom surface has a profile comprising a first portion and a second portion. The first portion and second portion are lower than the plurality of side walls and at least a lower-most point of the second portion is lower than at least one point of the first portion.

Thus, the present invention provides a liquid detector that has a housing configured to more readily drain liquid from its surfaces. By having the lower-most point of the bottom surface below the lower-most point of the plurality of side walls, liquid will be drawn down the side walls and onto the bottom surface. Further, as more liquid is drawn to the bottom surface, it will accumulate and drip off the lower-most point of the bottom surface, thus removing the liquid from the housing surfaces. This removal of liquid reduces the risk of erroneous measurements by the sensor, as there is less liquid retained on the surfaces of the detector housing. A further advantage of the present invention is its applicability to liquid sensors that detect liquid levels, as well as liquid sensors that detect the presence of liquid. This allows devices, such as pump motors, whose operation varies depending on the detected liquid level, to be operated more accurately.

The first of the plurality of side walls may comprise an inner surface having a normal axis extending in a first direction. The sensor may be mounted such that the sensing surface is in a substantially vertical orientation. The sensing surface may intersect the normal axis, and the lower-most point of the second portion may be spaced from the first of the plurality of side walls by a greater distance than the sensing surface in the first direction This advantageously locates the lower-most point of the bottom surface away from the sensing surface. In particular, this configuration draws liquid behind and below the sensor, further reducing the risk of false detection by the sensor.

The first portion and second portion may intersect to form a ridge. The lower-most point of the bottom surface may be on the ridge. This configuration advantageously reduces the likelihood of a meniscus forming that bridges the gap between the bulk of the condensate and the housing, reducing the likelihood of a false sensor reading.

The first portion is arranged to form a first acute angle with a first normal axis of the first of the plurality of side walls. The second portion may be arranged to form a second acute angle with a second normal axis of a second of the plurality of side walls. The second of the plurality of side walls may be opposed to the first of the plurality of side walls. By forming the bottom surface from two angled portions, liquid is drawn from the side walls and onto the angled portions. As liquid accumulates on the angled portions, it is preferably drawn towards an intersection between the two angled surfaces. The intersection is preferably the lower-most point of the bottom surface, and causes liquid to fall as droplets from the lower-most point which in turn reduces the amount of liquid retained on the housing surface and reduces the chance of an erroneous sensor measurement.

The housing may comprise a hydrophobic material. At least one of the plurality of side walls may comprise a hydrophobic coating applied thereto. The hydrophobic coating may be applied to an outer surface of the first of the plurality of side walls. At least one of the plurality of side walls may comprise an oleophobic coating applied thereto. Incorporating a hydrophobic material or applying a hydrophobic coating or an oleophobic coating to the surface of one or more of the side walls further reduces the amount of liquid retained on the housing surface.

The housing may comprise a biasing member. The biasing member may be configured to urge the sensing surface towards the first of the plurality of side walls. Including a biasing member allows for greater tolerances in sensor placement during the production of the liquid detector, as the biasing member will urge the sensing surface towards the first of the side walls of the housing, thus improving the reliability of the liquid detectors.

The sensor may be a capacitance sensor.

Viewed from a further independent aspect, the present invention provides a pump comprising a fluid inlet, a fluid outlet, a reservoir configured to receive liquid from the fluid inlet, a pump motor configured to pump liquid from the reservoir to the fluid outlet, and a liquid detector according to any of the appended claim. The liquid detector may be configured to detect a liquid level in the reservoir.

A portion of the liquid detector housing may define a receptacle that extends into the reservoir. The receptacle may be configured to receive at least the sensing surface.

The pump motor may comprise a motor inlet, and the motor inlet may be vertically spaced from the lower-most point of the second portion by a first distance. The first distance may be 1.9 mm. The first distance may be greater than 1.9 mm. For example, the first distance may be 2.0 mm, 2.5 mm, 3.0 mm or greater. One advantage of providing a greater vertical spacing between the motor inlet and the lower-most point of the second portion is the reduced risk of drawing air into the motor inlet when the liquid level has passed below the predetermined "low" or shut off point at the bottom of the sensor.

Viewed from a further independent aspect, the present invention provides an adapter for a sensor comprising: a body having a plurality of side walls and a bottom surface, and securing means configured to secure the body to a housing of a sensor, the housing having a defined surface on which liquid is detected by the sensor. The plurality of side walls extends from a top end to a lower end. The bottom surface has a profile having a first portion and a second portion and the first portion and second portion are lower than the plurality of side walls. A lower-most point of the second portion is lower than at least one point of the first portion. The body is configured to receive at least a part of the housing. A first of the plurality of side walls is in contact with the defined surface of the liquid sensor, such that, in use, the liquid sensor can detect liquid on the first of the plurality of side walls.

BRIEF DESCRIPTION OF THE DRAWINGS

Embodiments of the invention are further described hereinafter with reference to the accompanying drawings, in which.

DETAILED DESCRIPTION

Figure 1:
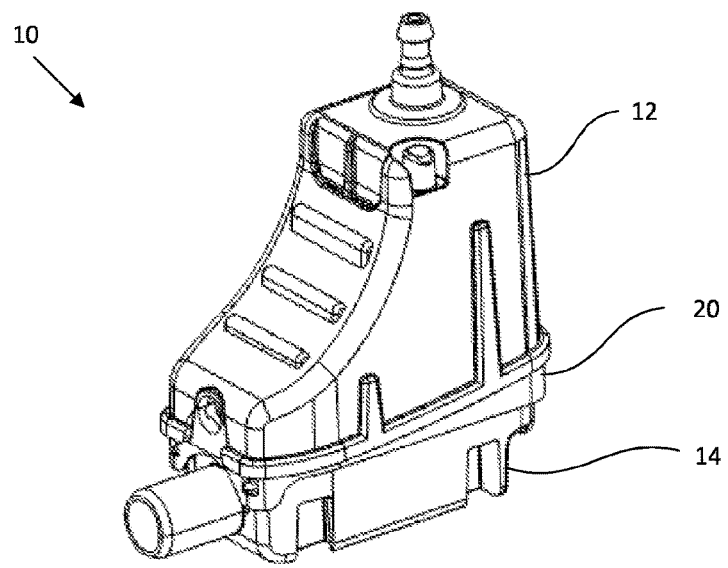
FIG. 1 illustrates a perspective view of a condensate pump having a condensate reservoir.

FIG. 1 illustrates a perspective view of a condensate pump 10 having an upper housing portion 12, and intermediate housing portion 20 and a reservoir 14. The reservoir 14 is, preferably, releasably secured to the intermediate housing portion 20 so that a user can, for example, detach the reservoir 14 and clean the internal volume of the reservoir 14. The upper housing portion 12 is shown as being separable from the intermediate housing portion 20, but it would be apparent that these two parts may be formed as a single component.

Figure 2:
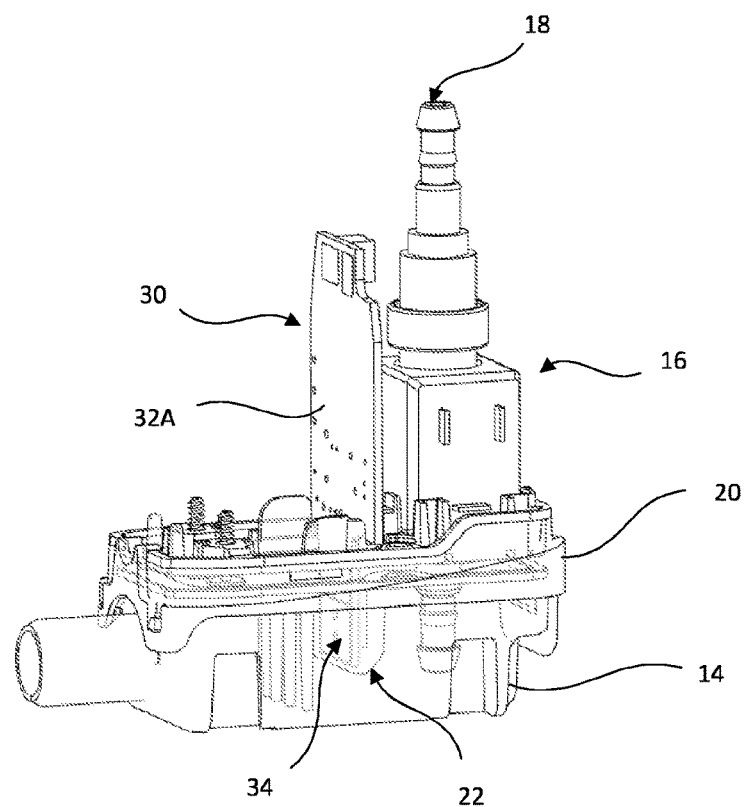
FIG. 2 illustrates a perspective view of a liquid level sensor having a sensing surface extending into the condensate reservoir.

FIG. 2 illustrates the moulded profile of the intermediate housing portion 20 which allows a liquid level sensor 30 and a pump motor 16 to be held securely by the intermediate housing portion 20. The underside of the intermediate housing portion 20 also acts as a barrier between the upper housing portion 12 and internal volume of the condensate reservoir 14. This substantially reduces the likelihood of liquid within the reservoir 14 coming into contact with the electrical components housed within the upper housing portion 12, including the PCB of the liquid level sensor 30, the pump motor 16, power cables and wiring between a pump controller (not shown) and any constituent component of the condensate pump 10.

Figure 3:
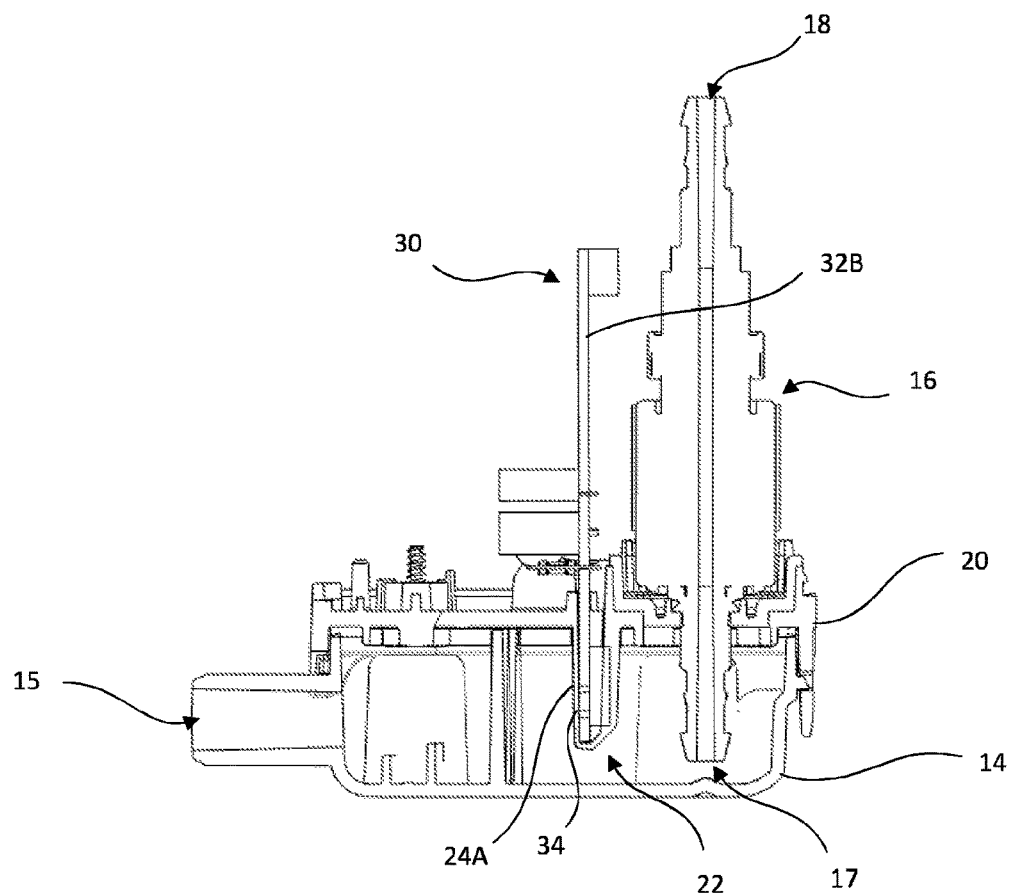
FIG. 3 illustrates a cross-sectional side view of the liquid level sensor contained within the housing and extending into the condensate reservoir.
Figure 4:
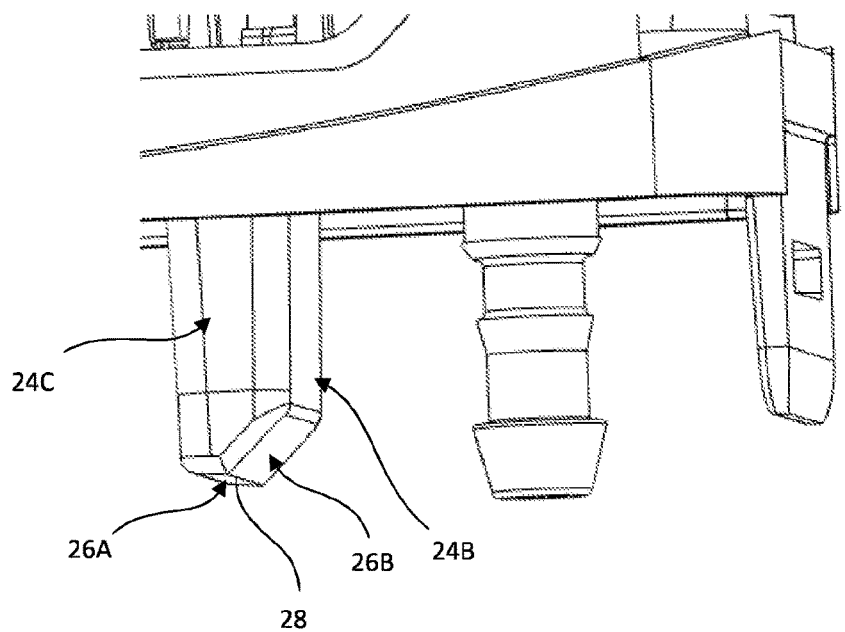
FIG. 4 illustrates a rear perspective view of the housing containing the liquid level sensor.
Figure 5:
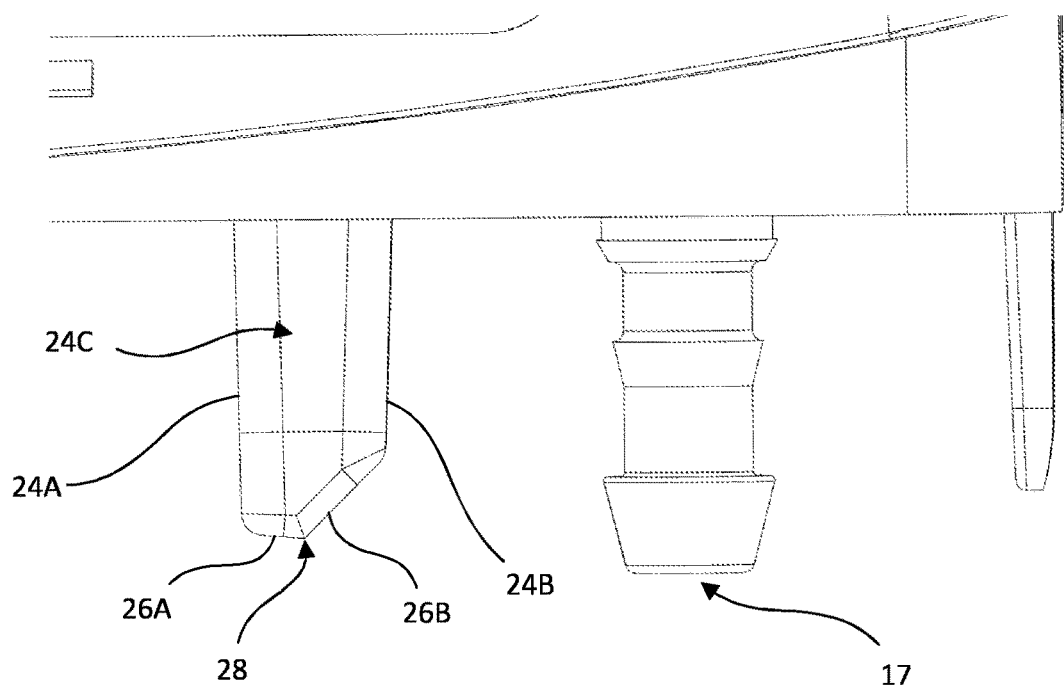
FIG. 5 illustrates a side view of the housing containing the liquid level sensor and a pump motor inlet.

In the illustrated example, a part of the intermediate housing portion 20 is formed as a receptacle 22 which extends downwardly into the reservoir 14. The receptacle 22 receives a sensing surface 34 of the liquid level sensor 30 and effectively "dips" the sensing surface 34 into the condensate as the reservoir 14 fills which allows the liquid level sensor 30 to detect the level of condensate within the reservoir 14. The sensing surface 34 illustrated is substantially flat and planar and can be considered to have a sensing direction perpendicular to the side walls 24A, 24B of the receptacle 22. More accurate detection of the liquid level within the reservoir 14 allows the pump motor 16 to be controlled in a way which minimises energy consumption and noise production. Typically, a capacitance sensor is used to detect the liquid level in the reservoir 14. In particular, the capacitance sensor enables the change in capacitance in front of the sensing surface 34 to be calculated, as condensate fills the reservoir 14. By calibrating the capacitance sensor with known volumes of liquid within the reservoir 14, it is possible to estimate the liquid level for a given determination of capacitance. A capacitance sensor will detect changes in the environment in front of the sensing surface 34, which will include measuring through a side wall 24A (see FIG. 3) of the receptacle 22. Therefore, to provide accurate liquid level measurements, it is important to keep the thickness of the receptacle walls 24A, 24B to a minimum. It is also advantageous to keep the sensing surface 34 as close to the side wall 24A as possible to reduce the distance between the sensing surface 34 and the condensate within the reservoir 14.

Figure 6:
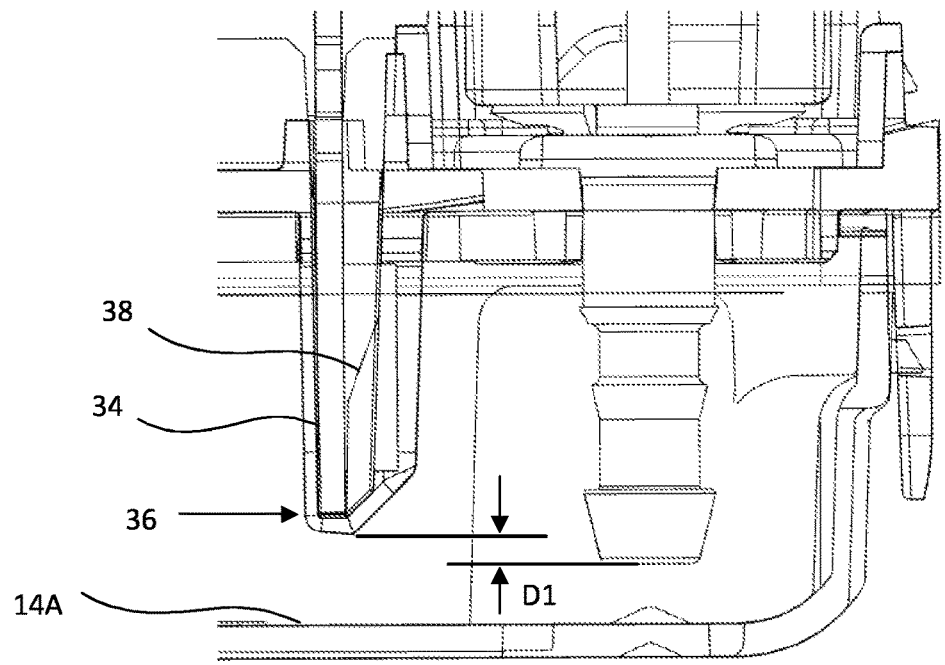
FIG. 6 provides a close-up cross-sectional view of the sensing surface and pump motor inlet within the reservoir.

As shown in FIG. 6, the receptacle 22 also preferably includes a biasing member 38. The biasing member 38 is located within the receptacle 22 and is used to push the liquid level sensor 30, in particular the sensing surface 34, towards the side wall 24A of the receptacle 22. This reduces the distance between the sensing surface 34 and the condensate and improves the accuracy of the liquid level sensor 30. In one example, the biasing member can push the sensing surface towards a side wall having a hydrophobic nanocoating applied thereon. While the biasing member 38 is illustrated as a finger resiliently extending from side wall 24B and bottom surface 26B, it would be apparent that the biasing member 38 can take other forms, such as one or more protrusions. It would also be apparent that the biasing member 38 may extend from only one or more bottom surfaces or one or more side walls, for example, only side wall 26B or the rear side wall 24B.

While the sensing surface 34 is shown oriented vertically and parallel to the side wall 24A, it would be apparent that this was not essential and the liquid level sensor 30 may still be effective even when the sensing surface is not substantially parallel to the side wall 24A. While a capacitance sensor is provided as an exemplary type of sensor, it would be apparent that the present invention can be used with other types of sensors that measure liquid level in a non-contact manner.

In relation to the problem of liquid being retained on a side wall 24A in front of the sensing surface 34, it has been found that profiling the receptacle 22 in a particular manner can reduce the amount of liquid retained on the outer surface of the receptacle 22. The profile of the receptacle 22 is best shown in FIGS. 3 to 6 and the subsequent description will refer to these Figures interchangeably.

Figure 7A:
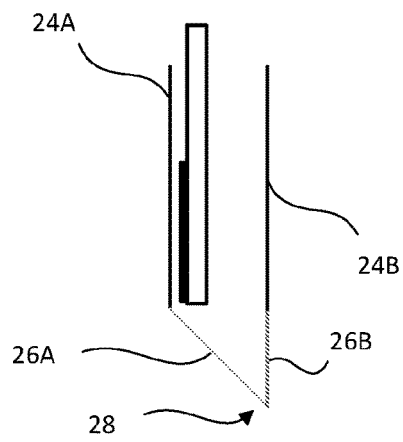
FIGS. 7A to 7G illustrate lateral cross-sectional views of possible receptacle configurations.
Figure 7B:
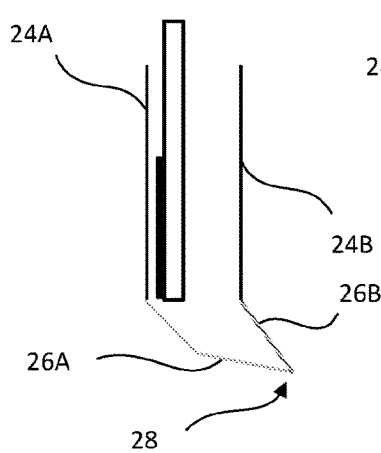
Figure 7C:
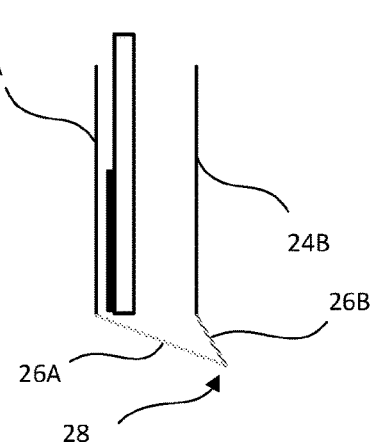
Figure 7D:
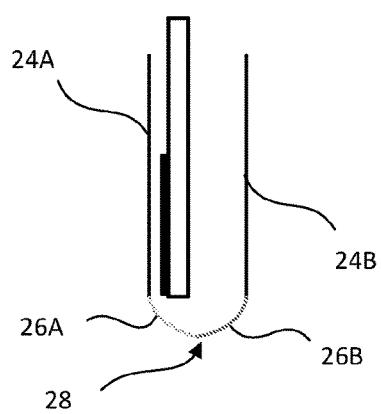
Figure 7E:
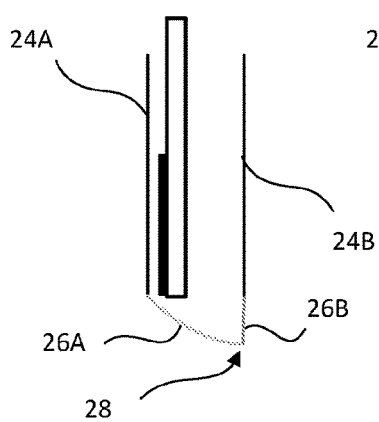
Figure 7F:
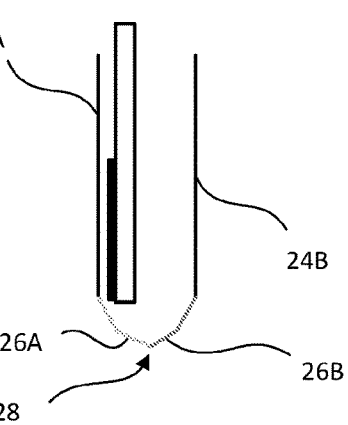
Figure 7G:
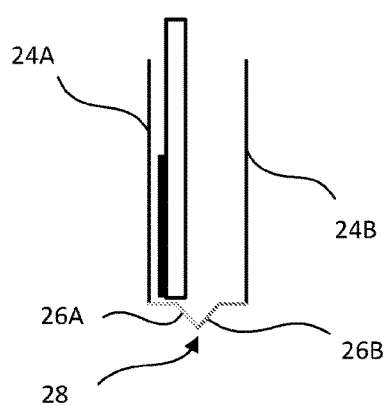

In the illustrated embodiment, the receptacle 22 is shown having opposed side walls 24A, 24B that may be considered as "front" and "rear" walls. The front wall, side wall 24A, faces the sensing surface 34 and a front surface 32A of the liquid level sensor 30, while the rear wall, side wall 24B, faces a rear surface 32B of the liquid level sensor 30. The receptacle 22 also comprises further side walls, for example side wall 24C, that connects the front wall 24A to the rear wall 24B. The combination of front, rear and side walls can be used to determine the cross-sectional profile of the receptacle 22. While the illustrated receptacle 22 is shown having a substantially rectangular cross-sectional profile, it would be apparent that the cross-sectional profile will be determined by the number and relative orientation of the different front rear and side walls. For example, a cross-sectional profile in the shape of a three-, four-, five-, six-, etc. sided polygon would be achievable. In the example illustrated in FIGS. 2 to 6, side walls 24A, 24B extend from the intermediate housing portion 20 into the reservoir 14. At the lower ends of the side walls 24A, 24B there is a bottom surface. The bottom surface has a profile comprising two angled bottom portions 26A, 26B. The first bottom portion 26A extends from the front wall 24A at a first acute angle and the second bottom portion 26B extends from the rear wall 24B at a second acute angle. The first 26A and second 26B bottom portions may also connect with the further walls such as side wall 24C. The intersection of the bottom portions 26A, 26B can be used to define a lower-most point 28 of the receptacle 22. In the illustrated examples of FIGS. 2 to 6, the lower-most point 28 is formed as a ridge or edge extending across the bottom surface with the first side wall 24A being in front of the sensing surface 34 and the second side wall 24B being behind the sensing surface 34. It is preferable to locate the lower-most point 28 behind the sensing surface 34, as any liquid formed on the front side wall 24A will be drawn down and away from the sensing surface 34. Locating the lower-most point 28 behind the sensing surface 34 also greatly reduces the risk of any liquid attached to the bottom surface 26A of the receptacle 22 being detected by the liquid level sensor 30. While a bottom surface formed of two angled portions 26A, 26B intersecting to form a ridge 28 is shown, it would be apparent that other combinations of angled and/or curved surfaces may be used to locate the lower-most point 28 of the bottom surface in a desired location relative to the sensing surface 34 (see FIGS. 7A to 7G). For example, a bottom surface having a rounded cross-sectional profile would also draw liquid away from the sensing surface 34 (FIGS. 7D to 7F). The lower-most point 28 may be formed as a point, for example if a bottom surface having a hemispherical profile is used (FIGS. 7D and 7F). In one example, the lower-most point 28 may be formed by a simple diagonal profile (FIGS. 7A & 7E). In this case, the second portion 26B is contiguous with the rear wall 24B and merges with the angled bottom portion 26A that extends from the front wall 24A. Consequently, liquid is drawn from the front wall 24A down the angled bottom portion 26A to the lower-most point 28 of the second angled portion 36B. In another example, the bottom surface may be profiled so as to have a trapezoidal profile (FIG. 7B).

One advantage of forming the lower-most point 28 as on a ridge on the bottom surface is that, compared to a flat horizontal surface, the surface area on which a droplet can form is greatly reduced. Therefore, only a much smaller droplet can form before the weight of the droplet exceeds what can be supported by the surface tension of the droplet on the ridge. This further reduces the amount of liquid that can form on the bottom portions 26A, 26B of the receptacle 22, and consequently reduces the risk of erroneous liquid level readings by the liquid level sensor 30. By selecting the angle between the bottom portion 26A, 26B and their respective side walls 24A, 24B, it is possible to create a more or less sharp ridge, and thus determine how much liquid can be acceptably retained on the base of the receptacle 22. This is a compromise, because, while forming the lower-most point 28 as a sharp point may be desirable, this would require the reservoir 14, and consequently the entire condensate pump 10, to have a greater depth than is desirable, or even possible. For example, it is often desirable to have a small condensate pump 10. In this case, having two angled portions 26A, 26B is preferable to a single angled surface, as a relatively sharp ridge can be obtained without requiring a significant reservoir 14 depth. However, in situations where there is no such constraint, forming the lower-most point 28 as a sharper point may be possible using one or more angled surfaces. In the example illustrated in FIGS. 2 to 6, the angle between the bottom portion 26A and the front side wall 24A is smaller than the angle between the bottom portion 26B and the rear side wall 24B. This is because the geometry of bottom portion 26B is not restricted by the components of the liquid level sensor 30. Therefore, bottom portion 26B may form a larger angle with side wall 24B so as to form a sharper ridge with bottom portion 26A.

Due to the space constraints within the reservoir 14, it is not possible to have a large gap between the pump motor inlet 17 and the lower-most point 28 of the receptacle 22, as the condensate reservoir 14 does not have a large depth. In the example illustrated in FIGS. 2 to 6, the sensing surface 34 extends substantially to the lower-most end of the sensor 30, which is in close proximity to the bottom portion 26A of the receptacle 22. As it is preferable to keep the liquid level within the reservoir 14 above the level of the pump motor inlet 17, so as to avoid air being drawn into the pump, it is important to maintain a minimum depth of condensate between the bottom surface 14A of the reservoir and the pump motor inlet 17. In condensate pumps 10, there may only be a few millimetres between the pump motor inlet 17 and the lower-most point 28 of the receptacle 22 ("Dl" in FIG. 6). This distance is further reduced by the fact the pump motor 16 is preferably stopped when the condensate drops below the lower-most point 28 of the receptacle 22. Therefore, it is important that the liquid level sensor 30 can accurately detect when the condensate level has actually dropped below the apex 28 of the receptacle 22, as the pump motor 16 will need to be shut off to avoid the condensate level dropping below the level of the motor inlet 17 and drawing air into the pump motor 16. With such a small gap, it is possible for a meniscus to form between the side walls 24A, 24B or bottom portions 26A, 26B and the surface of the condensate, even when the bulk of the condensate is below the lower-most point 28 of the receptacle 22. By forming the lower-most point 28 below and behind the sensing surface 34, the angled bottom portions 26A, 26B will draw the liquid towards the lower-most point 28 away from the side walls 24A, 24B and draw the meniscus to the lower-most point 28 so that it releases from the receptacle 22.

To further reduce the amount of liquid retained on the receptacle 22, a hydrophobic nanocoating may be applied to the receptacle 22. In particular, the hydrophobic nanocoating may be applied to the front wall 24A in front of the sensing surface 34. Alternatively, at least a part of the intermediate portion 20 may comprise a hydrophobic material. An oleophobic nanocoating may be applied to the receptacle 22 in addition or alternatively to the hydrophobic nanocoating.

While the present invention has been described in the context of condensate pumps 10, it would be apparent that the benefits of the present invention extend to other fields and to sensors which measure a liquid level via non-contact means in general. For example, in liquid storage tanks, a liquid sensor may be needed to detect the liquid level within the liquid storage tank. By designing a liquid level sensor housing with a lower-most point arranged in the manner described above, it is possible to more accurately detect the liquid level in the liquid storage tank. Similarly, while the present invention has been described in the context of determining liquid level, it would be apparent that the liquid level sensor may be configured to simply detect the presence of liquid. In this case, the present invention would still provide benefits to such a sensor.

It would also be apparent that the present invention may be implemented as an adapter in the form of, for example, a sleeve or shroud that may be retrofitted to the housing of existing liquid level sensors. An adapter that goes around a part of the housing containing the sensing surface of a liquid level sensor that provides the benefits of the present invention would be desirable in a number of situations. The adapter body would include a suitably profiled bottom surface having a lower-most point that draws liquid away from the side walls of the body, and thus the side walls of the liquid level sensor housing contained within. By forming a body with appropriately thin walls, the decrease in accuracy due to the increased distance between the sensing surface and the condensate would be smaller than the increased accuracy and reliability due to the reduced retention of liquids on the sensor housing surface. Furthermore, an adapter would be beneficial in situations where it is preferable to retrofit an existing liquid level sensor rather than replace the entire device. Such a sleeve may be attached to the housing of an existing liquid level sensor by any number of temporary or permanent securing means, such as fixings, rigid straps, resiliently deformable members (e.g. elasticated bands), adhesives, magnets, etc.

Throughout the description and claims of this specification, the words "comprise" and "contain" and variations of them mean "including but not limited to", and they are not intended to (and do not) exclude other components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The invention claimed is:
1. A liquid detector comprising:
a housing adapted to couple to a surface of an external reservoir having side walls and a bottom surface, wherein the bottom surface has a profile including first and second portions that are lower than the side walls, and at least a lowest point of the second portion is lower than at least a point of the first portion; and
a sensor mounted within the housing and having a sensing surface configured to detect a liquid on an outer surface of a first of the side walls, wherein the first of the side walls includes an inner surface having a normal axis extending in a first direction, the sensor is mounted such that the sensing surface is in a substantially vertical orientation and the sensing surface is spaced a first distance from the first of the side walls in the first direction, the sensing surface intersects the normal axis, and the lowest point of the second portion is spaced from the first of the side walls by a second distance in the first direction, and the second distance is greater than the first distance.

2. A liquid detector according to claim 1, wherein the first and second portions intersect each other to form a ridge.

3. A liquid detector according to claim 1, wherein the first portion is arranged to form a first acute angle with the first normal axis of the first of the side walls.

4. A liquid detector according to claim 3, wherein the second portion is arranged to form a second acute angle with a second normal axis of a second of the side walls, and wherein the second of the side walls opposes the first of the side walls.

5. A liquid detector according to claim 1, wherein the housing includes a hydrophobic material.

6. A liquid detector according to claim 1, wherein at least one of the side walls includes a hydrophobic coating applied thereto.

7. A liquid detector according to claim 6, wherein the hydrophobic coating is applied to an outer surface of the first of the side walls.

8. A liquid detector according to claim 1, wherein at least one of the side walls includes an oleophobic coating applied thereto.

9. A liquid detector according to claim 1, wherein the housing includes a biasing member that is configured to urge the sensing surface towards the first of the side walls.

10. A liquid detector according to claim 1, wherein the sensor is a capacitance sensor.

11. An adapter for a sensor, the adapter comprising:

a body having side walls and a bottom surface, wherein the bottom surface has a profile including first and second portions, the first and second portions are lower than the side walls, a lowest point of the second portion is lower than at least a point of the first portion, the body is configured to receive at least a part of a housing for the sensor, the housing having a defined surface on which liquid is detected by the sensor, and wherein a first of the side walls is in contact with the defined surface of the liquid sensor, such that, in use, the sensor can detect liquid on the first of the side walls, the first of the side walls includes an inner surface having a normal axis extending in a first direction, the housing is mounted such that the defined surface is in a substantially vertical orientation and the defined surface is spaced a first distance from the first of the side walls in the first direction, the defined surface intersects the normal axis, and the lowest point of the second portion is spaced from the first of the side walls by a second distance in the first direction, and the second distance is greater than the first distance.

* * * * *